(12) United States Patent
Fieschi et al.

(10) Patent No.: US 6,628,655 B1
(45) Date of Patent: Sep. 30, 2003

(54) METHOD OF SELF-LEARNING FOR THE SWITCHING NODES OF A DATA TRANSMISSION NETWORK

(75) Inventors: Jacques Fieschi, St Laurent du Var (FR); Claude Galand, La Colle sur Loup (FR); Jean-François Le Pennec, Nice (FR); Patrick Michel, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/490,767

(22) Filed: Jan. 24, 2000

(30) Foreign Application Priority Data

Feb. 26, 1999 (EP) .............................................. 99480003

(51) Int. Cl.$^7$ .......................... H04L 12/28; H04L 12/56
(52) U.S. Cl. ......................... 370/389; 370/402; 709/238
(58) Field of Search ................................ 370/229, 329, 370/352, 355, 389, 392, 400, 401, 402, 409, 359, 397; 709/238, 242, 244

(56) References Cited

U.S. PATENT DOCUMENTS

| | | | | |
|---|---|---|---|---|
| 5,717,691 A | * | 2/1998 | Dighe et al. ................. | 370/401 |
| 5,903,559 A | * | 5/1999 | Acharya et al. ............. | 370/355 |
| 5,996,021 A | * | 11/1999 | Civanlar et al. ............. | 709/238 |
| 6,151,324 A | * | 11/2000 | Belser et al. ................. | 370/397 |
| 6,434,156 B1 | * | 8/2002 | Yeh ............................. | 370/401 |
| 6,449,251 B1 | * | 9/2002 | Awadallah et al. .......... | 370/229 |

OTHER PUBLICATIONS

Bob Sultan: "A swicth–router taxomony" Computer Communications vol. 21, Mar. 1, 1998, pp. 101–110, XP002112317 UK *the whole Document.

Y. Rekhter, B. Davis, D. Katz, E. Rosen, G. Swallow: Cisco Systems, Inc. "Cisco Systems Tag Switching Architecture Overview" Online! Retrieved from Internet:, URL: ftp://ftp.isi.edu/in–notes/rfc2105.txt. Feb. 1997 Xp002111745 *p. 2–p. 9*.

Konish S J Rr: "Layer 3 Switching Alternatives" IEEE Military Communications Conference. Proceedings. Milcom 98, vol. 1, 1998, pp. 287–291, XP002111744 New York, USA *the whole document*.

Shishir Agrawal, "IP Switching" Online! Retrieved from Internet:<URL: httpL//www.cis.ohio–state.edu/{jain/cis788–97/ip–Switching/index.htm>Aug. 16, 1997 XP002111746 *the whole document*.

* cited by examiner

*Primary Examiner*—Hassan Kizou
*Assistant Examiner*—Afsar M Qureshi

(57) ABSTRACT

Method of self-learning for a switching node in a data transmission network (10) wherein Internet Protocol (IP) data frames are transmitted between a sending unit (20 or 24) and a receiving unit (22 or 26) via an ingress switching node (12) linked to an egress switching node (16 or 18) by a plurality of intermediate switching nodes (14) interconnected by trunks. The method consists principally in generating, in the input port/trunk interface of the switching node, a switch header including a source identification field, a destination identification field and a temporary label identifying the flow of data in response to its first data frame, this first switch header being concatenated to said data frame before being transmitted to the router interface of the switching node via its switch engine when the data frame does not belong to a known flow of data and the router has to define the routing of the flow of data. An update message is sent back from the output trunk/port interface to the input port/trunk interface to update the latter with the destination identification and with a switching label replacing the temporary label associated with the flow of data, in order to transmit the following frames of the flow of data directly to the trunk/port interface by using this switching label.

17 Claims, 8 Drawing Sheets

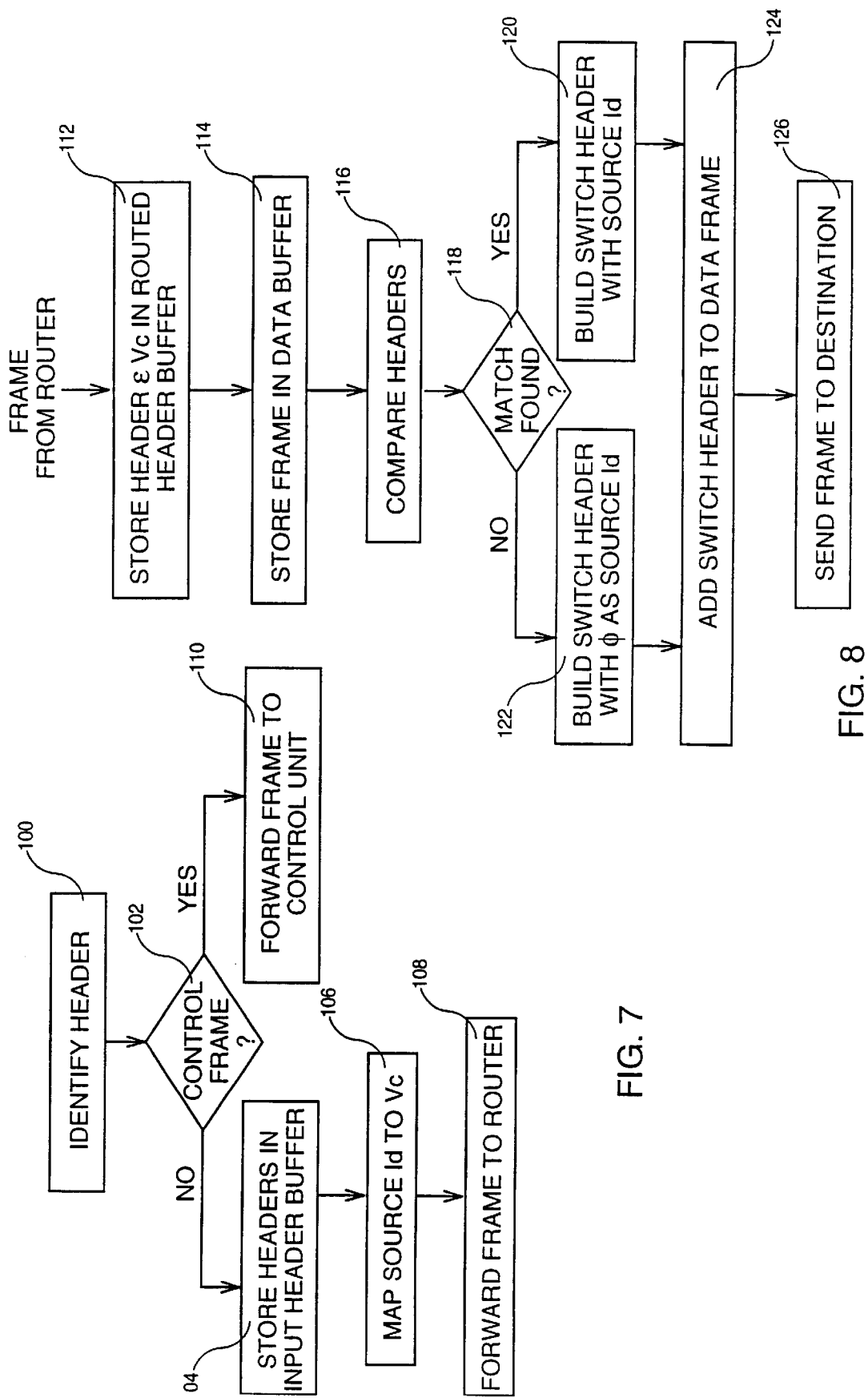

METHOD OF SELF-LEARNING FOR THE SWITCHING NODES OF A DATA TRANSMISSION NETWORK

TECHNICAL FIELD

The present invention relates generally to the switching of the data packets in each switching node of a data transmission network supporting the Internet Protocol (IP) and particularly to a method of self-learning for the switching nodes of such a data transmission network.

BACKGROUND

Today's data communications and networks would not exist without routers. Routers are essential to link Local Area Networks (LAN) and remote sites. The "routing" function involves two basic activities: determination of routing paths and the transport of information packets or frames through the network referred as the "switching" function. Path determination may be based on a variety of metrics which are values resulting from algorithmic computations. Software implementations of routing algorithms calculate route metrics to determine optimal routes to a destination. To aid the process of path determination, routing algorithms initialize and maintain routing tables which contain route information depending on the routing algorithm used.

Since routing is considered to be one of the major bottlenecks in networks within the past few years, routers have become less central of building networks and being replaced by switches. The current trend is "switch when you can, route when you must". In fact, it is easier to setup and maintain switches than routers insofar as switching algorithms are relatively simple and are basically the same for many routing protocols.

Integrating the functions of routing and switching in one product can improve network performance and achieve easy-to-manage administration. Such a switching node integrating the routing function is often called an IP switch in an IP data transmission network. In spite of the integration of the two functions, such an IP switch uses nevertheless a protocol, proprietary of course, between the routing part and the switching part of the switching node.

The drawback of an integrated switching node is the dependency on a limited number of IP switch manufacturers. The skills and expenses required to build a very efficient router requiring a lot of software with regular updates, and complex and sophisticated hardware for the switching system, are available only in a limited number of companies which have thus acquired a kind of monopoly on such products.

An alternate system is to interface the IP switch with the router by using a dedicated protocol such as General Switch Management Protocol (GSMP) proposed by Ipsilon Company. The drawback in this solution is first to find a router manufacturer offering this interface inasmuch as large router manufacturers prefer to build IP switches integrating the routing function. Then, it is necessary to implement this protocol which requires a complex development. The last drawback but not the least is the risk that as long as it is not a standard, such a specific protocol be withdrawn by the limited number of companies marketing it.

SUMMARY OF THE INVENTION

Accordingly, it is an object of the invention to provide an IP switch using a separated legacy router and without requiring the implementation of a specific protocol between the switch and the router.

Another object of the invention is to achieve a method of learning for a switching node using a separated legacy router such that the router is released of the switching tasks after the first frame of a flow has been transmitted by the switching node.

BRIEF DESCRIPTION OF THE DRAWINGS

The objects, features and other characteristics of the present invention will be more readily understood in conjunction with the accompanying drawings in which:

FIG. 7 is a flow chart of the processing steps performed by the router interface illustrated in FIG. 6 when a data frame is transmitted to the router.

FIG. 8 is a flow chart of the processing steps performed by the router interface illustrated in FIG. 6 when a data frame is received from the router.

DETAILED DESCRIPTION OF THE INVENTION

Figure 1:
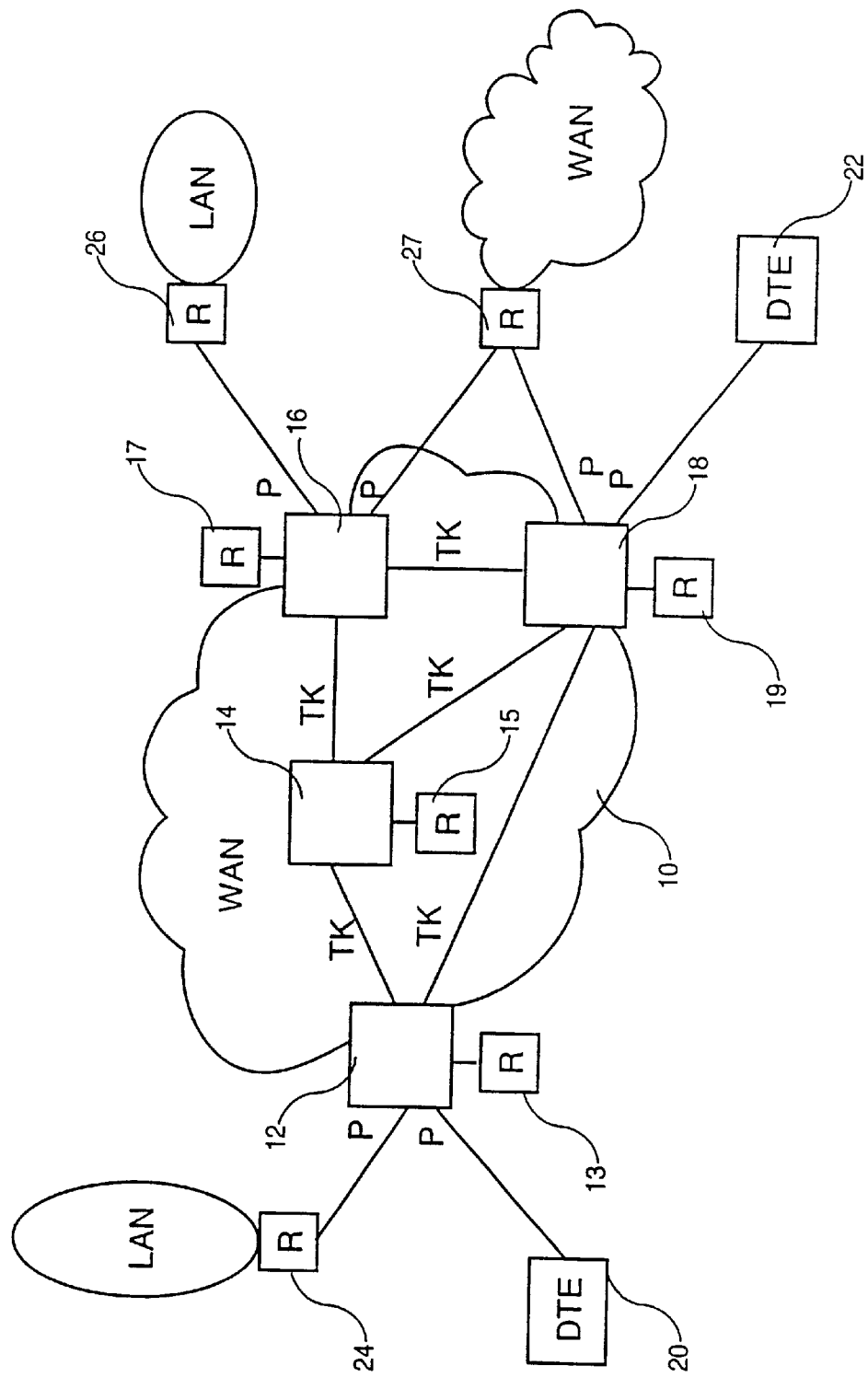
FIG. 1 represents schematically a global network including switching nodes wherein the method of the invention can be implemented.

FIG. 1 represents a global network providing the interconnection of access devices through an IP network 10 (such as a WAN) including a plurality of switching nodes such as nodes 12, 14, 16 and 18 wherein the invention is implemented. Each of these nodes is associated with a router R such as routers 13, 15, 17 and 19 respectively associated with nodes 12, 14, 16 and 18, in charge of the routing function.

The peripheral units such as DTE's 20 or 22 or legacy routers 24, 26 or 27 linked to other networks such as LANs or other WANs are connected to the switching nodes of the network 10 by ports (P), whereas the switching nodes of network 10 are interconnected by trunks (TK).

Figure 2:
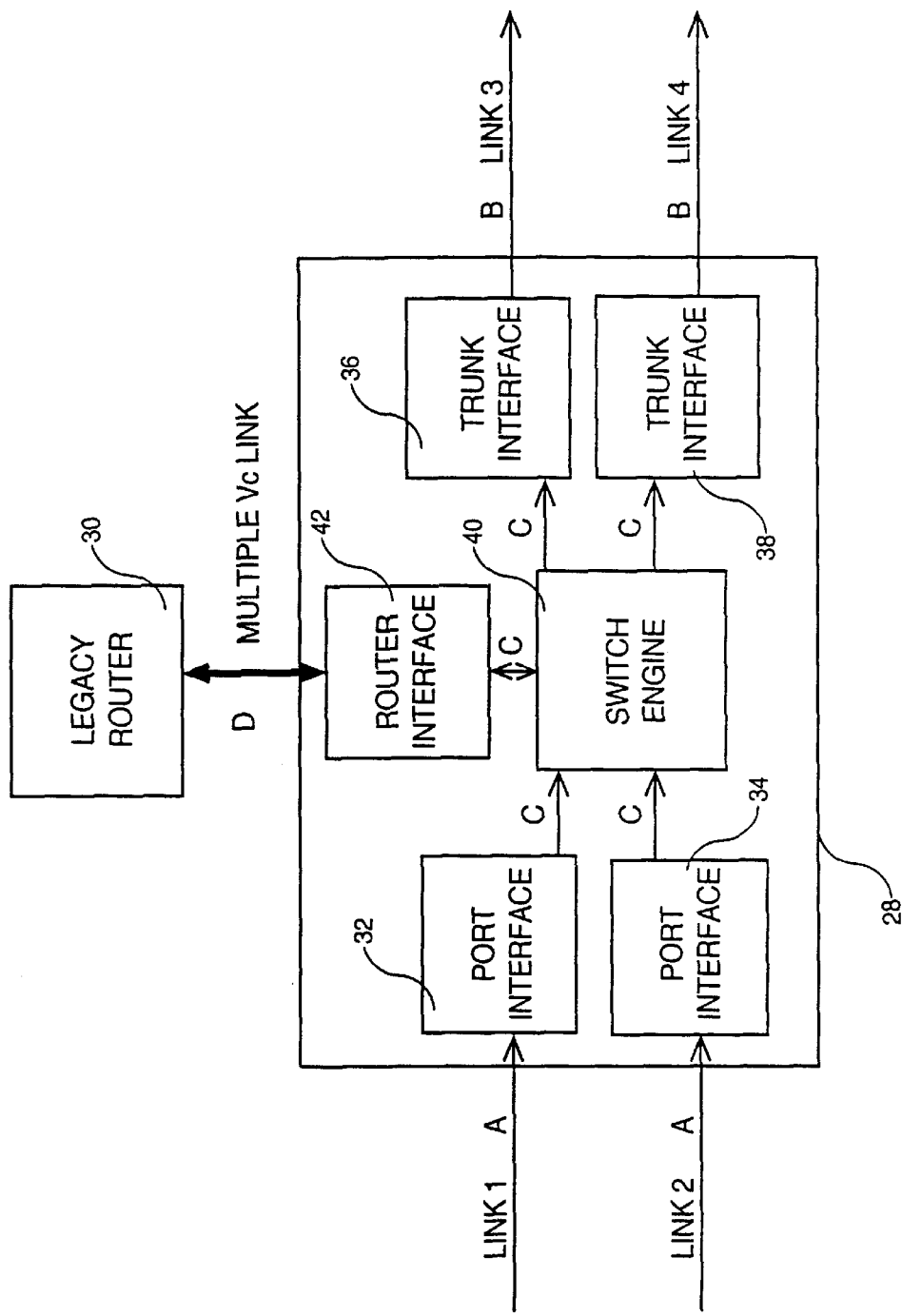
FIG. 2 is a block-diagram of an ingress switching node associated with a legacy router and showing the different elements used to implement the method of the invention.

As illustrated in FIG. 2, a switching node 28 wherein the method of the invention is implemented, is connected to a legacy router 30 by a physical link which is a multiple link allowing to get several virtual independent logical links such as Virtual Circuits (Vc). Node 28 is an ingress node having two port interfaces 32 and 34 connected respectively to input Link 1 and Link 2, and two trunk interfaces 36 and 38 connected respectively to output Link 3 and Link 4.

The port and trunk interfaces are connected to Switch Engine 40 which is connected to Legacy Router 30 by a Router Interface 42 and performs the switching function. It would be possible to add other routing interfaces and routers for backup, load balancing, extension of the routing capacity, security. The router use is defined at the port or trunk level and may be different for each flow.

Although the switching node illustrated in FIG. 2 is an ingress node, the invention could be implemented in an egress node wherein input links are connected to trunk interfaces and output links are connected to port interfaces, or an intermediate node wherein input links as well as output links are connected to trunk interfaces.

Figure 3:
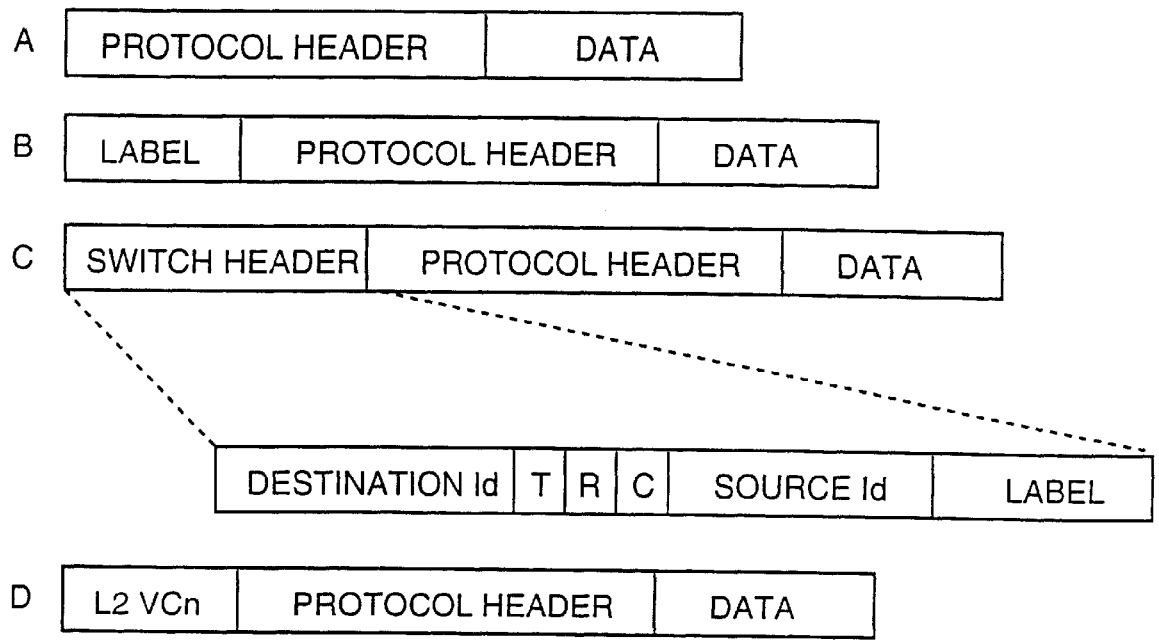
FIG. 3 represents the different formats of the frame which are built in a switching node when a frame is received at the input port/trunk interface.

The format of the frames which are received by switching node 28, transmitted over the network by switching node 28 or communicated between the elements of switching node 28 are represented in FIG. 3 by letters A, B, C, D which are also mentioned in the figure.

Thus, a first frame of a flow of data having a format A arriving on Link 1 of Port Interface 32 should be routed as there is not yet switching information available in the switching node. Port Interface 32 forwards the frame having format C to Router Interface 42 via Switch Engine 40. Router Interface 42 encapsulates the frame in Vc 32 which is devoted to all data coming from Port Interface 32. Router 30 which receives the frame having format D from Router Interface 42, performs the routing function and finds the route to the next router. Assuming that the next router is connected by Link 3, the router defines the path to Link 3 on Vc 36 corresponding to trunk interface 36. The frame is sent from Router 30 to Router Interface 42 with format D on Vc 36 and then to the Trunk Interface 36 through Switch Engine 40 with format C. Finally, the frame is sent on Link 3 with a label that is used to address the next router on this link, while an update of Port Interface as explained hereafter is made to allow switching of all further frames of the same flow from Port Interface 32 directly to Trunk Interface 36 via Switch Engine 40. In fact, there is a simple mapping between each port or trunk number and the Vc number to make a physical link to logical Vc association, allowing to identify the destination path of a frame in the router interface.

It must be noted that an important feature of the invention is the addition of a switch header in the format of a frame transported between the different elements of a switching node, as illustrated in FIG. 3. Such a switch header includes a source Id which is filled with the identification of the input port (or trunk), a destination Id which is set first to the identification of the router interface by the port/trunk interface and then to the trunk/port interface by the router if the frame belongs to a new flow of data or is set to the output interface if the frame belongs to a known flow of data. The label field is filled first with a temporary label during the self learning routing phase when the first frame is processed and then with a switching label during the second phase when the following frames are processed. The switch header also includes three bits:

T set to 0 when the input link is connected to a port, and set to 1 when the input link is connect to a trunk, R set to 0 when there is no routing to be made and set to 1 when routing is necessary because it is the first frame of a flow of data, C is set to 0 for a data frame and set to 1 for a control frame.

Figure 5:
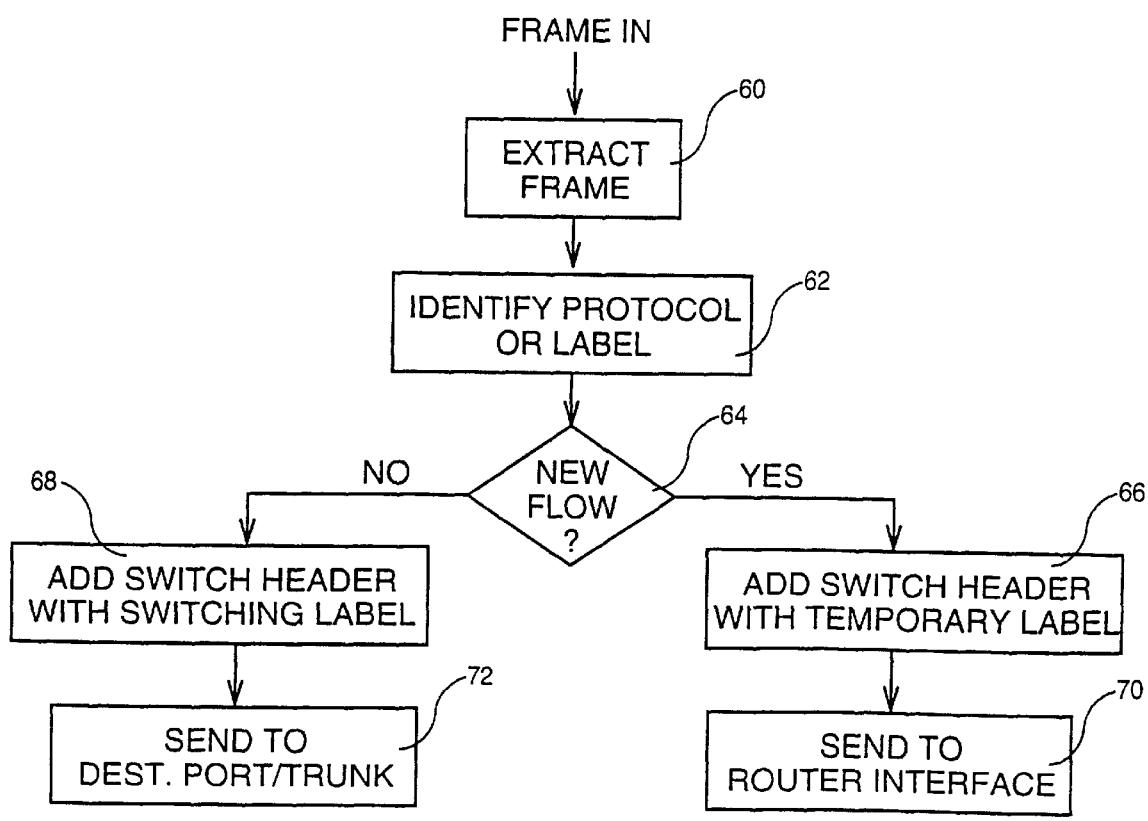
FIG. 5 is a flow chart of the processing steps performed in the input port/trunk interface illustrated in FIG. 4.
Figure 4:
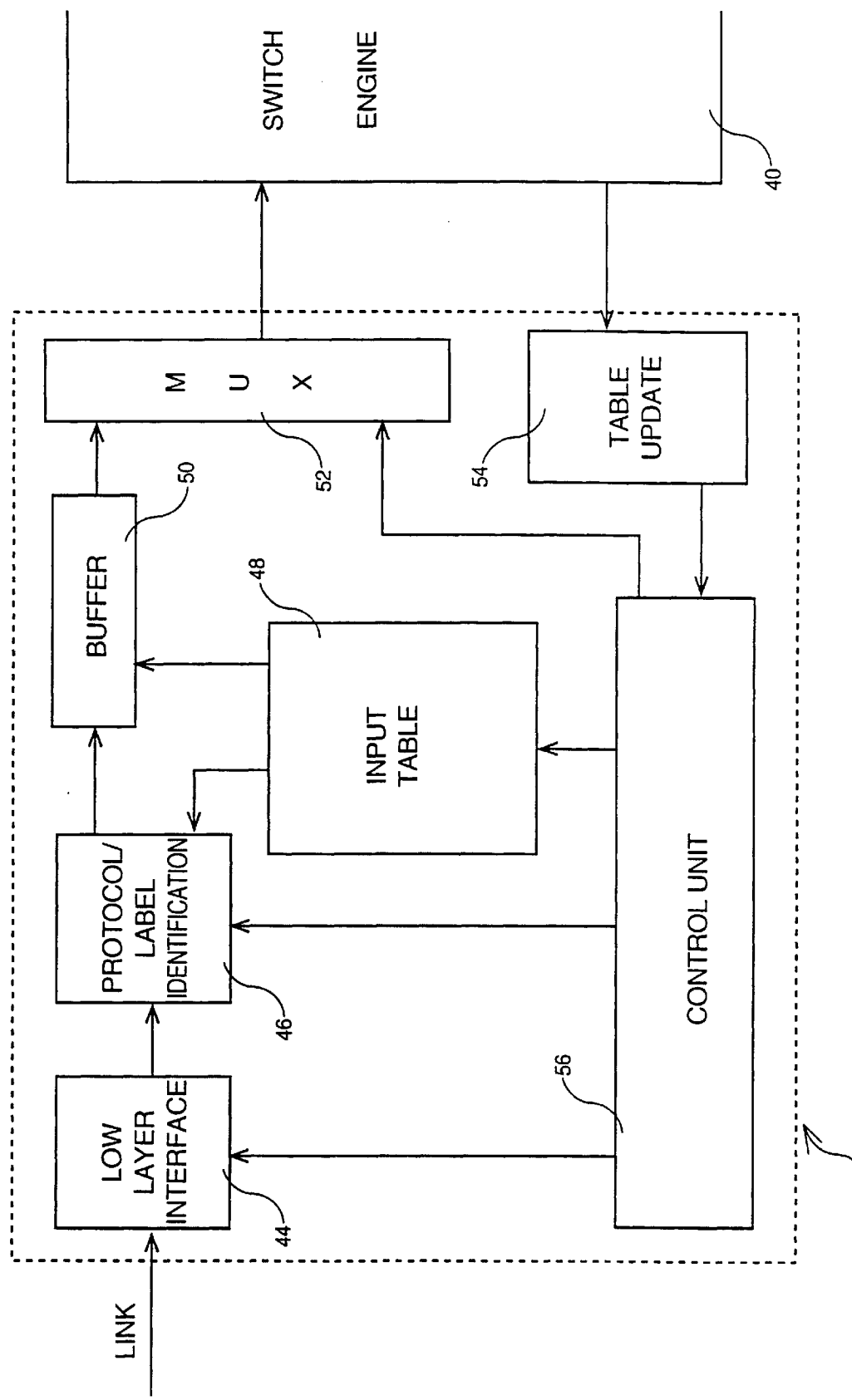
FIG. 4 is block-diagram of an input port/trunk interface used in the implementation of the method according to the invention.

FIG. 4 represents an input interface such as port interface 32 (or 34) or trunk interface 36 (or 38) of FIG. 2, where the data frames are received from an external link, and FIG. 5 is a flow chart of the processing steps performed in the input interface.

The frames are first processed by Low Layer Interface 44 wherein they are extracted (step 60) from the lower layers 1 (physical layer) and 2 (e.g. ATM or frame relay). The layer 3 protocol is then identified (step 62) in Protocol Label Identification Unit 46. Thus, some fields of the frame header are checked to identify the kind of flow to which it belongs. This can be made by looking at the flow identification of the frame (if any) or at various fields including the originating and the destination address. This process involves to look up in an Input Table 48 and allows to determine (step 64) whether the data frame belongs to a known flow or to a new flow.

A switch header having the format illustrated in FIG. 3 is then added to the data frame by Input Table 48 which had been previously stored in Buffer 50 by Protocol Identification 46. Either it is a new flow of data and the added switch header will contain a new free label (step 66) used as a temporary label or it is a known flow of data and the added switch header will contain the label found in Input Table 48 by the lookup process (step 68), this label being called switching label. The data frame with its switch header is then forwarded via Multiplexer 52 to Switch Engine 40. The latter transmits the data frame either to router interface (step 70) or to the output port/trunk interface (step 72), this destination being defined by the destination Id field of the switch header added to the data frame.

Port interface 32 also includes a Table Update unit 54 receiving update messages from Switch Engine 40, such messages containing a switching label for a flow of data and information about the destination output port/trunk that should be stored in Input Table 48 to identify a new switched flow of data in order to switch the next frames of this flow directly to the output port/trunk. After decoding of the update message, Table Update unit 54 sends it to Control unit 56 which updates Input Table 48. Note that further to the input table updating, Control unit 56 also sends a message to Router Interface 42 (see FIG. 2) via Multiplexer 52 and Switch Engine 40 in order to clear the field which was set during an input header buffer as explained hereafter.

It must be noted that, for the intermediate switching node or for an egress node wherein the input link is connected to a trunk instead of a port, it is not the protocol which is identified (step 62) but rather the routing label which has been assigned to the data frame by the preceding switching node (see format B in FIG. 3). In such a case, there is no need to determine whether it is a new flow or a known flow as the label used on the input link indicates whether the frame should be routed or switched.

Figure 6:
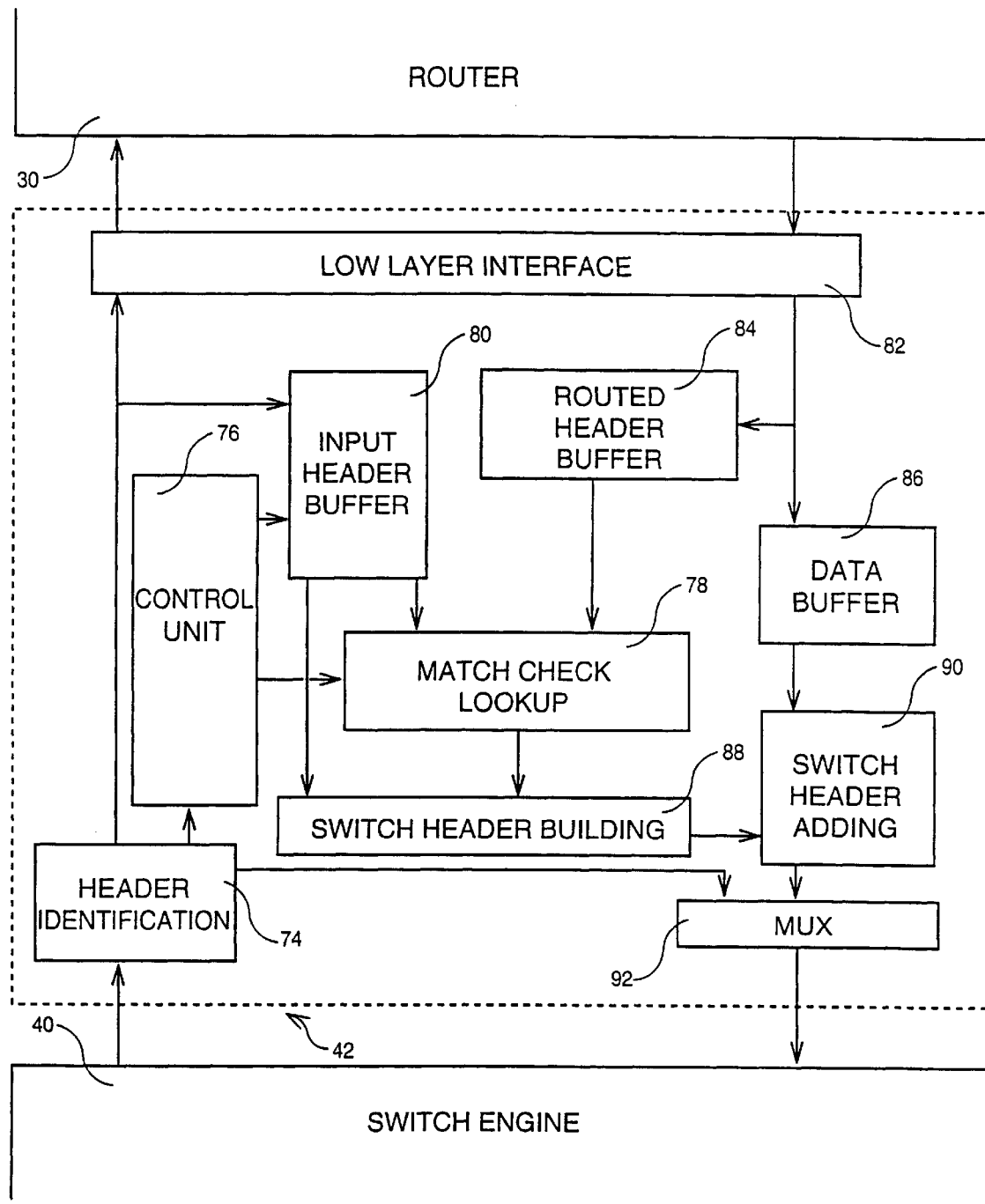
FIG. 6 is a block-diagram of a router interface used in the implementation of the method according to the invention.

FIG. 6 represents Router Interface 42 of FIG. 2, and FIGS. 7 and 8 are flow charts giving the processing steps performed in the Router Interface when the data frame is transferred respectively from the router interface to the router and from the router to the router interface.

An incoming data frame from Switching Engine 40 is first identified (step 100 of FIG. 7) by Header Identification unit 74 in order to check (step 102) if the frame is a data frame or a control frame. If it is a data frame, this one is sent to Input Header Buffer 80 wherein the protocol header and the switch header are stored (step 104) and to Low Layer Interface 82 to be encapsulated with layers 1 and 2 in the virtual circuit corresponding to the source Id which is available in the switch header. This is made by mapping (step 106) the value of the source Id to the corresponding Vc added by Low Layer Interface 82. At this time, the switch header is removed and the encapsulated frame is sent to Router 30 to be handled as a normal frame (step 108).

When a control frame is identified, it is forwarded to Control Unit 76 (step 110). The latter uses the data field of the control frame to perform some actions such as initialization of Match Check Lookup unit 78 to define the checking to be performed, or clearing of the temporary label stored in Input Header Buffer 80 because a flow of data has been assigned. Note that such a clearing of Input Header Buffer is also performed automatically by using a timer. Indeed, the fields corresponding to an output frame that has not been associated with an input frame after a predetermined period of time may be cleared insofar as the input frame may be considered as being retained by the router. Such a predetermined time before clearing an unused frame depends upon the router and network characteristics, but is generally between 10 ms and 100 ms.

As there is some processing done in the router on each frame which is not necessarily the same for each flow, the order of the frames transmitted to the router may not be the order of the frames received on the router interface from the router. In addition, some frames sent to the router may have for destination the router itself and therefore will never be seen at the input of the router interface. Furthermore, the router itself generates some traffic for example to the other routers in the networks, to some servers such as DNS servers or network management servers. So, the incoming frame type on the router interface is unpredictable. Thus, there is a need to identify each incoming frame to classify it by checking whether it corresponds to a frame sent on the output of the router interface or if it is a unknown frame.

An incoming frame from Router 30 in virtual circuit Vc m is first received by Low Layer Interface 82. After removing layers 1 and 2, the protocol header of the frame and the number Vc on which the frame was received are stored (step 112) in Routed Header Buffer 84, and the full frame is stored in Data Buffer 86 (step 114). Then, a comparison between the protocol header just stored in Routed Header Buffer 34 with protocol headers stored in Input Header Buffer 80 is made (step 116) by using Match Check Lookup unit 78. Note that this comparison is generally not made on the full protocol header since some fields may have been changed by the router. The fields which may be useful are the protocol type, the flow Id (if available), the source and destination addresses, upper protocol types, etc.

The actions are different according to whether a match is found (step 118) from the lookup step. If so, Switch Header Building unit 88 builds the new switch header of the frame by using the source information found in Input Header Buffer, in particular the source Id and the associated temporary label (step 120). If not, the new switch header is built by using 0 as source Id and 0 as label (step 122). Other fields are switched with the same values, that is R=1, C=0 and T depending upon the source port or trunk. The destination Id corresponds to the Vc value m on which the frame was received. In both cases, the new switch header is added by Switch Header Adding unit 90 to the data frame which had been stored in Data Buffer 86 (step 124) before being transmitted to the destination output trunk/port interface via Multiplexer 92 and Switch Engine 40 (step 126).

Figure 9:
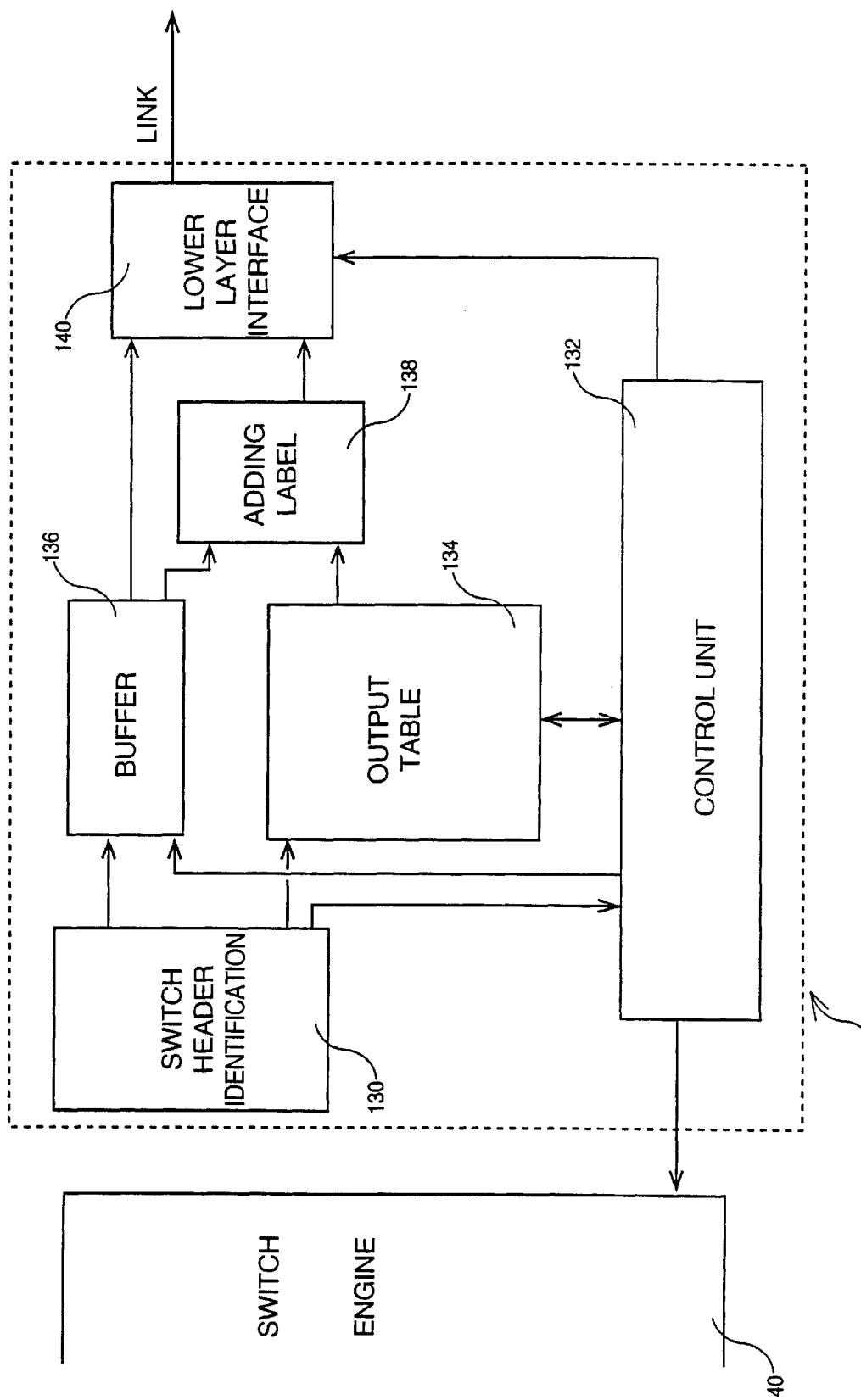
FIG. 9 is a block-diagram of an output trunk/port interface used in the implementation of the method according to the invention.
Figure 10:
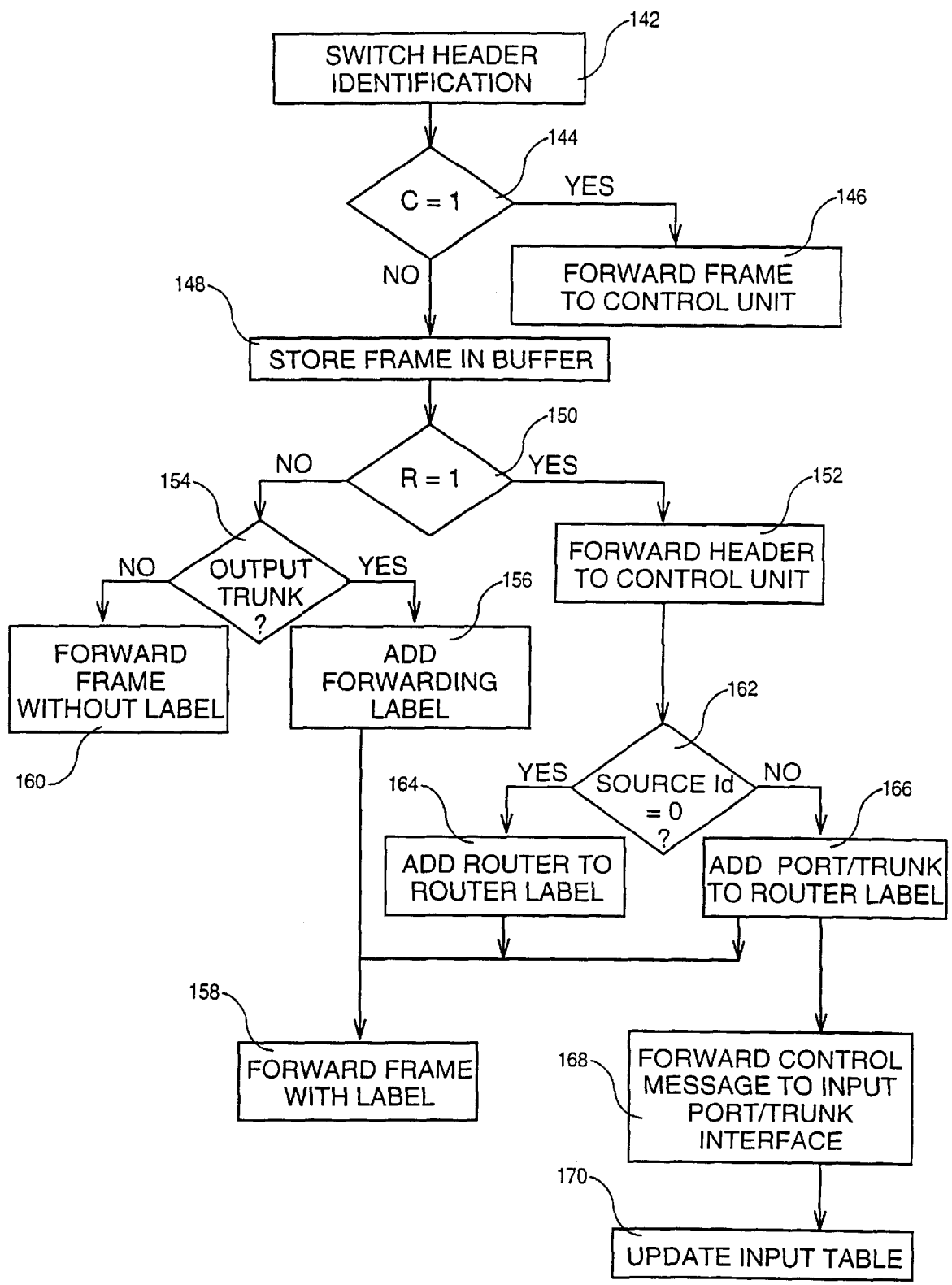
FIG. 10 is a flow chart of the processing steps performed by the output trunk/port interface illustrated in FIG. 9 when a data frame has to be transmitted.

FIG. 9 representing a block diagram of an output trunk/port interface is now described in combination with FIG. 10 representing a flow chart of the processing steps performed in the trunk/port interface when the data frame is transmitted over the network to the next switching node or to the receiving unit.

A data frame transferred from Switch Engine 40 comes from either a port/trunk interface or from the router interface. Therefore, several processings may be implemented depending upon the contents of the second switch header which is concatenated to the frame and determines whether it is a routed frame, a switched frame, or a control message.

Accordingly, the switch header is identified by Switch Header Identification unit 130 (step 142). The parameter to determine is the value of C in the switch header to check whether the received frame is a control frame or a data frame (step 144). If it is a control frame (C=1) this one is sent to control unit 132 (step 146) which performs requested actions such as initialization of Output Table 134 or sends back a control message via Switch Engine 40.

If the received frame is a data frame (C=0), the data frame together with the temporary label included in the switch header is stored in buffer 136 (step 148). Then, a test is performed to determine the value of R in the switch header (step 150). If R=1 meaning that the frame has been transmitted by the router, the switch header is forwarded to Control unit 132 (step 152). If R=0 meaning that the frame has been transmitted by an input port/trunk interface, a test is made (step 154) to determine whether the output interface is a trunk interface or a port interface. In the first case a forwarding label provided by Output Table 134 is added to the data frame stored in Buffer 136 by Adding Label unit 138 before being encapsulated with layers 1 and 2, by Lower Layer Interface 140 and then transmitted (step 158) to the next switching node. In the second case, when the output interface is a port interface meaning that the switching node is an egress node, the data frame is transmitted without label (step 160) directly by Buffer 136 wherein it is stored to the receiving unit.

When the received frame has been transmitted by the router (R=1) and that the switch header has been transmitted to Control Unit 132 (step 152), a test is made by the latter unit to check whether the value of source Id in the switch header is 0 meaning that the frame has been initiated by the router, or is 1 meaning that the 10 frame comes from an input port/trunk interface (step 162). In the first case, a routing label which is of the router to router type is added by Adding Label unit 138 (step 164) to the data frame before being encapsulated in Lower Layer Interface 140 and forwarded to the next switching node (step 158). In the second case, a routing label which is of a port/trunk to router type is added by Adding Label unit 138 (step 166) to the data frame before being encapsulated in Lower Layer Interface 140 and forwarded to the next switching node (step 158).

In addition to adding a port/trunk to router label to the data frame, Control Unit 132 has to inform the input port/trunk interface that a switching label has to be associated with the new flow of data. For this, a control message is sent by Control Unit 132 to the input port/trunk interface via Switch Engine 40 (step 168). This message comprises a switch header composed of a Source Id which is the Source Id included in the frame received from the router interface, a Destination Id which corresponds to the source input interface, a Label which is the temporary label included in the switch header received from the router interface in order to identify the flow. The message also contains an information field telling that it is an input table update message, the current port/trunk Id which was the destination Id of the frame received from the router interface, and the switching label which will be used for switching the next frames of the same flow of data. When the message is received by the input port/trunk interface, Input Table 48 (see FIG. 4) is updated (step 170) with necessary information, that is the switching label and the destination Id (current port/trunk Id of the message) associated with the source Id (Destination Id in the switch header of the message). Note that another Control message has to be sent at this time by Control Unit 132 to clear the temporary label Input Header Buffer 80 of the router interface as mentioned hereabove in reference to FIG. 6 and FIG. 7.

It should be noticed that the switching label sent to the input port or trunk may be either the final forwarding label used for data transmission on the output trunk or may be replaced in the output trunk interface by a forwarding label using a direct mapping in output table 134. It may be the case if a forwarding label shares several flows having each a different switching label but the same destination. This mechanism is also called label merging.

What is claimed is:

1. A method comprising the steps of:
  a) checking whether a data frame moving through an ingress switching node in a data transmission network wherein Internet Protocol (IP) data frames are transmitted between a sending unit connected to the ingress switching node and a receiving unit connected to an egress switching node, the ingress switching node being linked to the egress switching node by a plurality of intermediate switching nodes interconnected by trunks and each of the ingress switching node, egress switching node and intermediate switching nodes including a switch engine in charge of switching any data frame from an input port/trunk interfacing the switch engine by an input port/trunk interface to an output trunk/port interfacing the switch engine by an output trunk/port interface and a router interfacing the switch engine by a router interface in charge of routing each flow of data from an ingress switching node to an egress switching node when the first data frame of said flow of data is received by the ingress switching node by looking up an input table in the input port interface of the ingress switching node whether said data frame belongs to a known flow of data,
  b) generating, in the input port interface, a first switch header including a source identification field, a destination identification field and a temporary label identifying the flow of data in response to the first data frame, the first switch header being concatenated to the data frame,
  c) transmitting the data frame with the concatenated first switch header to the router interface via the switch engine when the data frame does not belong to a known flow of data,
  d) storing the source identification and temporary label contained in the first switch header in a buffer of the router interface before transmitting the data frame to the router for defining routing of the flow of data to which the data frame belongs,
  e) comparing all data frames received by the router interface from the router with all the source identifications stored in the buffer to determine the data frame to be routed,
  f) generating a second switch header including the source identification field and the temporary label for the data frame, and a destination identification field determined from the routing information provided by the router, the second switch header being concatenated to the data frame,
  g) transmitting the data frame with the concatenated second switch header to the output trunk interface defined in the destination identification field of the second switch header via the switch engine, and
  b) sending back an update message from the output trunk interface to the input port interface via the switch engine to update the input table with a switching label associated with the flow of data and the destination identification while the data frame with a corresponding routing label is transmitted by the output trunk interface over the network.

2. A method according to claim 1, comprising the steps of:
  a) generating in the input port interface in response to detection that the data frame belongs to a known data flow a unique switch header including a source identification field, a destination identification field defining an output trunk interface as the destination of the data frame, and a forwarding label, the unique switch header being concatenated to the data frame,
  b) sending the data frame with the concatenated unique switch header to the output trunk interface defined in the destination identification field of the unique switch header via the switch engine, and,
  c) transmitting the data frame from the output trunk interface over the network with the forwarding label.

3. A method according to claim 2, wherein the unique switch header concatenated to the data frame is composed by using the contents of the input table which have been updated by the update message and wherein the switching label is used as forwarding label.

4. A method according to claim 1, wherein the identification field of the first switch header defines the router as the destination for the data frame when this one does not belong to a known flow of data.

5. A method according to claim 1 wherein the destination identification for the second switch header defines the output trunk interface which is mapped to a virtual circuit between the router and the router interface.

6. A method comprising the steps of:
  a) identifying as a routing label assigned by an output trunk interface of a node a label concatenated with an Internet Protocol (IP) data frame being transmitted between a sending unit connected to an ingress switching node and a receiving unit connected to an egress switching node, the ingress switching node being linked to the egress switching node by a plurality of intermediate switching nodes interconnected by trunks, and each of the ingress switching node, egress switching node and intermediate switching nodes including a switch engine in charge of switching any data frame from an input port/trunk interfacing the switch engine by an input port/trunk interface to an output trunk/port interfacing the switch engine by an output trunk/port interface and a router interfacing the switch engine by a router interface in charge of routing each flow of data from the ingress switching node to the egress switching node when the first data frame of the flow of data is received by the intermediate switching node
  b) generating, in the input port interface of the intermediate switching node, a first switch header including a source identification field, a destination identification field and a temporary label identifying the flow of data in response to the first data frame, the first switch header being concatenated to the data frame,
  c) transmitting the data frame with the concatenated first switch header to the router interface via the switch engine when the data frame does not belong to a known flow of data,
  d) storing the source identification and default label contained in the first switch header in a buffer of the router interface before transmitting the data frame to the router for defining routing of the flow of data to which the data frame belongs, e) comparing all data frames received by the router interface from the router with all the source identifications stored in the buffer to determine the data frame to be routed, f) generating a second switch header including the source identification field and the temporary label for the data frame, and a destination identification field determined from the routing information provided by the router, the second switch header being concatenated to the data frame, g) transmitting the data frame with the concatenated second switch header to the output trunk/port interface defined in the destination identification field of the second switch header via the switch engine, h) sending back an update message from the output trunk interface to the input trunk interface via the switch engine to update the input table with a switching label associated with the flow of data and the destination identification while the data frame with a corresponding routing label is transmitted by the output trunk interface over the network.

7. A method according to claim 6 comprising the steps of:

a) generating in the input port interface in response to detection that the data frame belong to a known data flow a unique switch header including a source identification field, a destination identification field defining an output trunk interface as the destination of the data frame, and a forwarding label, the unique switch header being concatenated to the data frame, b) sending the data frame with the concatenated unique switch header to the output trunk interface defined in the destination identification field of the unique switch header via the switch engine, and, c) transmitting from the output trunk interface the data frame with the forwarding label over the network.

8. A method according to claim 7, wherein the unique switch header concatenated to the data frame is composed by using the contents of an input table which has been updated by the update message and wherein the switching label is used as forwarding label.

9. An intermediate switching node of a data network which executes the steps of claim 7.

10. A method according to claim 6, wherein the identification field of the first switch header defines the router as the destination for the data frame when the data frame does not belong to a known flow of data.

11. A method according to claim 6, wherein the destination identification for the second switch header defines the output trunk interface which is mapped to a virtual circuit between the router and the router interface.

12. A method comprising the steps of:

a) identifying as a routing label assigned by an output trunk interface a label concatenated with an Internet Protocol (IP) data frame transmitted between a sending unit connected to an ingress switching node and a receiving unit connected to an egress switching node, the ingress switching node being linked to the egress switching node by a plurality of intermediate switching nodes interconnected by trunks, and each of the ingress switching node, egress switching node and intermediate switching nodes including a switch engine in charge of switching any data frame from an input port/trunk interfacing the switch engine by an input port/trunk interface to an output trunk/port interfacing the switch engine by an output trunk/port interface and a router interfacing the switch engine by a router interface in charge of routing each flow of data from the ingress switching node to the egress switching node when the first data frame of the flow of data is received by the egress switching node;

b) generating, in the input port interface of the egress switching node, a first switch header including a source identification field, a destination identification field and a temporary label identifying the flow of data in response to the first data frame, the first switch header being concatenated to the data frame, c) transmitting the data frame with the concatenated first switch header to the router interface via the switch engine when said data frame does not belong to a known flow of data, d) storing the source identification and default label contained in the first switch header in a buffer of the router interface before transmitting the data frame to the router for defining routing of the flow of data to which the data frame belongs, e) comparing all data frames received by the router interface from the router with all the source identifications stored in the buffer to determine the data frame to be routed, f) generating a second switch header including the source identification field and the temporary label for said data frame, and a destination identification field determined from the routing information provided by the router, the second switch header being concatenated to the data frame, g) transmitting the data frame with the concatenated second switch header to the output port interface defined in the destination identification field of the second switch header via the switch engine, h) sending back an update message from the output port interface to the input trunk interface via the switch engine to update the input table with the destination identification while the data frame is transmitted without label by the output port interface to the receiving unit.

13. A method according to claim 12 comprising the steps of:

a) generating in the input port interface in response to detection that the data frame belongs to a known flow of data a unique switch header including a source identification field, a destination identification field defining an output trunk interface as destination of the data frame, and a forwarding label, the unique switch header being concatenated to said data frame, b) sending the data frame with the concatenated unique switch header to the output trunk interface defined in the destination identification field of the unique switch header via the switch engine, and, c) transmitting the data frame with the forwarding label from the output trunk interface over the network.

14. A method according to claim 13, wherein the unique switch header concatenated to the data frame is composed by using the contents of an input table which has been updated by the update message and wherein the switching label is used as a forwarding label.

15. A method according to claim 12, wherein the identification field of the first switch header defines the router as the destination for the data frame when the data frame does not belong to a known flow of data.

16. A method according to claim 12, wherein the destination identification for the second switch header defines the output trunk interface which is mapped to a virtual circuit between the router and the router interface.

17. An egress switching node of a data network which executes the steps of claim 12.

* * * * *